BEST AVAILABLE COPY

UNITED STATES PATENT OFFICE.

ALFRED B. ELY, OF NEWTON, MASSACHUSETTS.

IMPROVEMENT IN HEEL-STIFFENERS.

Specification forming part of Letters Patent No. 72,727, dated December 31, 1867; Reissue No. 2,969, dated June 9, 1868.

*To all whom it may concern:*

Be it known that I, ALFRED B. ELY, of Newton, in the State of Massachusetts, have invented a new and useful Counter and Stiffener for the Heels of Boots and Shoes, or mode of making the same, of which the following is a description.

Counters have been made of metal, leather, and rubber. My invention consists in making them of a composition of hard resins or other resinous substances and fibrous materials mixed, and formed and molded by means of heat and pressure, and also in making them of felted or textile materials saturated or saturated and coated with any suitable substances which will impart to the article, when shaped by heat and pressure, the proper elasticity and hardness. The resin and fiber may be mixed in any suitable proportion, according to the quality of the material used, to give the compound the proper tenacity and hardness, and then, while warm, spread, rolled, or ground between rolls into sheets, and then cut in proper sizes and pressed into shape in heated molds; or the fibrous material, in sheets or in the form of a textile or woven or felted fabric, may be thoroughly saturated or saturated and coated with the resin or resinous gum, either pure or mixed with fiber, and then proper-sized pieces of this shaped in heated molds by pressure. The degree of heat may be regulated by the kind of article wanted for use. Sometimes it may be warmed or heated and pressed in molds of the required shape, and in some cases it will answer to be pressed without heat.

Felted and woven fabrics may be used saturated or saturated and coated with any suitable material, so that the article, when properly pressed and heated, or heated and pressed in molds, will assume the proper shape and acquire or possess the proper hardness and elasticity. A mixture of rubber and paraffine may be found useful for some kinds.

What I claim in the manufacture of counters and heel-stiffeners is—

1. The use of resinous bodies combined with fibrous materials, substantially as described.

2. A heel-stiffener made of the above-described substances, and formed into shape by means of pressure, with or without heat, substantially as described.

3. A heel-stiffener made of felted or woven fabric saturated with resinous or other gums or analogous substances, which, when properly heated and pressed in molds, will assume the proper shape and acquire or possess the proper hardness and elasticity, substantially as described.

ALFRED B. ELY.

Witnesses:
JOHN R. FRENCH,
D. E. SOMES.